United States Patent
Li et al.

(10) Patent No.: US 10,932,236 B2
(45) Date of Patent: Feb. 23, 2021

(54) METHOD FOR TRANSMITTING UPLINK CONTROL INFORMATION

(71) Applicant: Samsung Electronics Co., Ltd., Gyeonggi-do (KR)

(72) Inventors: Yingyang Li, Beijing (CN); Yi Wang, Beijing (CN); Jingxing Fu, Beijing (CN); Shichang Zhang, Beijing (CN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/738,048

(22) PCT Filed: Jun. 20, 2016

(86) PCT No.: PCT/KR2016/006503
§ 371 (c)(1),
(2) Date: Dec. 19, 2017

(87) PCT Pub. No.: WO2016/204585
PCT Pub. Date: Dec. 22, 2016

(65) Prior Publication Data
US 2018/0310298 A1 Oct. 25, 2018

(30) Foreign Application Priority Data

Jun. 19, 2015 (CN) .......................... 201510347835.9
Aug. 13, 2015 (CN) .......................... 201510498514.9
(Continued)

(51) Int. Cl.
*H04W 72/04* (2009.01)
*H04L 5/00* (2006.01)
(Continued)

(52) U.S. Cl.
CPC ....... *H04W 72/0413* (2013.01); *H04L 1/0031* (2013.01); *H04L 1/1671* (2013.01);
(Continued)

(58) Field of Classification Search
None
See application file for complete search history.

(56) References Cited

U.S. PATENT DOCUMENTS 9,722,735 B2 * 8/2017 Shin ...................... H04L 1/0028
370/329
2010/0098012 A1 * 4/2010 Bala ........................ H04L 5/001
370/329
(Continued)

FOREIGN PATENT DOCUMENTS

CN 103384183 11/2013
CN 104205710 12/2014
(Continued)

OTHER PUBLICATIONS

European Search Report dated May 30, 2018 issued in counterpart application No. 16811998.0-1219, 9 pages.
(Continued)

*Primary Examiner* — Anh Vu H Ly
(74) *Attorney, Agent, or Firm* — The Farrell Law Firm, P.C.

(57) ABSTRACT

Embodiments of the present disclosure provide a method for transmitting uplink control information. The method includes: a User Equipment (UE) receives Uplink Control Information UCI configuration information, wherein the UCI configuration information includes information for determining a periodicity, an offset and a Physical Uplink Control Channel PUCCH for Periodic-Channel State Information P-CSI to be report in one subframe and configuration information for transmission of Hybrid Automatic Retransmission reQuest-Acknowledgement HARQ-ACK; processes one or more kinds of UCI in the subframe, and transmits the UCI on resources using a PUCCH format. According to the method of the present disclosure, the transmit power for transmitting the UCI on the channel
(Continued)

the UE receives UCI configuration information, wherein the UCI configuration information includes configuration information for determining periodicity, offset and corresponding PUCCH for transmission of P-CSI in a subframe and configuration information for transmission of HARQ-ACK — 201 the UE processes one or more kinds of UCI in one subframe, and transmits the UCI on the PUCCH — 202 using the PUCCH format is optimized. During the transmission of the P-CSI, the PUCCH resource most preferable for the transmission of the P-CSI is determined. The uplink resource utilization ratio is increased.

20 Claims, 1 Drawing Sheet (30) Foreign Application Priority Data

Sep. 23, 2015 (CN) .......................... 201510612317.5
Oct. 15, 2015 (CN) .......................... 201510666982.2

(51) Int. Cl.
| H04L 1/18 | (2006.01) |
| H04L 1/00 | (2006.01) |
| H04W 52/34 | (2009.01) |
| H04W 52/32 | (2009.01) |
| H04L 1/16 | (2006.01) |
| H04W 52/18 | (2009.01) |
| H04W 52/14 | (2009.01) |
| H04W 88/02 | (2009.01) |

(52) U.S. Cl.
CPC .......... *H04L 1/1812* (2013.01); *H04L 1/1854* (2013.01); *H04L 1/1861* (2013.01); *H04L 5/0053* (2013.01); *H04L 5/0055* (2013.01); *H04L 5/0057* (2013.01); *H04W 52/146* (2013.01); *H04W 52/18* (2013.01); *H04W 52/325* (2013.01); *H04W 52/346* (2013.01); *H04W 88/02* (2013.01)

(56) References Cited

U.S. PATENT DOCUMENTS

| 2012/0113831 | A1* | 5/2012 | Pelletier | H04L 5/0053 370/252 |
| 2014/0078974 | A1 | 3/2014 | Falahati et al. | |
| 2014/0192738 | A1 | 7/2014 | Nam et al. | |
| 2014/0233477 | A1* | 8/2014 | Chu | H04L 5/0055 370/329 |
| 2014/0269452 | A1* | 9/2014 | Papasakellariou | H04W 72/0406 370/280 |
| 2014/0307643 | A1* | 10/2014 | Froberg Olsson | H04L 5/0053 370/329 |
| 2014/0369294 | A1 | 12/2014 | Seo et al. | |
| 2015/0146634 | A1* | 5/2015 | Hwang | H04L 5/0057 370/329 |
| 2015/0156762 | A1 | 6/2015 | Hwang et al. | |
| 2015/0341156 | A1 | 11/2015 | Yang et al. | |
| 2015/0358918 | A1* | 12/2015 | Gao | H04W 52/146 455/522 |
| 2016/0044606 | A1* | 2/2016 | Yin | H04W 52/325 455/450 |
| 2016/0183244 | A1* | 6/2016 | Papasakellariou | H04L 5/001 370/329 |
| 2016/0218790 | A1* | 7/2016 | Hwang | H04B 17/24 370/328 |
| 2016/0269974 | A1* | 9/2016 | Dinan | H04L 5/0053 370/329 |
| 2016/0270065 | A1* | 9/2016 | Dinan | H04L 5/0057 370/329 |
| 2016/0286495 | A1* | 9/2016 | Dinan | H04W 28/0221 370/329 |
| 2016/0338041 | A1* | 11/2016 | Li | H04L 5/0055 |
| 2017/0188311 | A1* | 6/2017 | Hwang | H04W 52/146 370/329 |
| 2017/0366380 | A1* | 12/2017 | Hwang | H04L 5/0053 370/329 |
| 2018/0109352 | A1* | 4/2018 | Nammi | H04L 1/0027 370/329 |
| 2018/0278366 | A1* | 9/2018 | Papasakellariou | H04L 5/00 |

FOREIGN PATENT DOCUMENTS

| CN | 104429014 | 3/2015 |
| EP | 2 797 253 | 10/2014 |
| EP | 2 942 896 | 11/2015 |
| WO | WO 2011/137408 | 11/2011 |
| WO | WO 2014/022862 | 2/2014 |
| WO | WO 2016/163855 | 10/2016 |

OTHER PUBLICATIONS

PCT/ISA/210 Search Report issued on PCT/KR2016/006503 (pp. 3).
PCT/ISA/237 Written Opinion issued on PCT/KR2016/006503 (pp. 7).
3GPP TSG RAN WG1 Meeting #81, Fukuoka, Japan, May 25-29, 2015, Enhancements to CSI feedback for CA beyond 5 carriers, pp. 7 (Huawei).
3GPP TSG RAN WG1 Meeting #81, Fukuoka, Japan, May 25-29, 2015, Power control to support up to 32 component carriers, pp. 5 (Huawei).
3GPP TSG RAN WG1 #81, May 25-29, 2015, Fukuoka, Japan, Further enhancements on UCI transmission under eCA, pp. 4 (Qualcomm).
3GPP TSG RAN WG1 Meeting #81, Fukuoka, Japan, May 25-29, 2015, Enhancements to UCI on PUSCH for Rel-13 CA, pp. 6 (LG Electronics).
China Master's Theses Full-text Database, No. 1, "Study on the Page Study of ACK_NACK Information Feedback and SRS Technology", Jan. 15, 2013, 77 pages.
Chinese Office Action dated Jun. 27, 2019 issued in counterpart application No. 201510666982.2, 21 pages.

* cited by examiner

METHOD FOR TRANSMITTING UPLINK CONTROL INFORMATION

PRIORITY

This application is a National Phase Entry of PCT International Application No. PCT/KR2016/006503 which was filed on Jun. 20, 2016, and claims priority to Chinese Patent Application Nos. 201510347835.9, 201510498514.9, 201510612317.5, and 201510666982.2, which were filed on Jun. 19, 2015, Aug. 13, 2015, Sep. 23, 2015, and Oct. 15, 2015, respectively, the content of each of which is incorporated herein by reference.

TECHNICAL FIELD

The present disclosure relates to wireless communication systems, and more particularly, to a method for transmitting uplink control information.

BACKGROUND ART

In LTE systems, multiple Component Carriers (CCs) may be aggregated to obtain a wider bandwidth acting as an uplink and a downlink of a communication system, i.e., Carrier Aggregation (CA) technique, so as to support higher transmission rate. At present, various kinds of CA techniques are supported. The aggregated cells may be all FDD cells, or may be all TDD cells with the same uplink-downlink configuration, or may be all TDD cells with different uplink-downlink configurations. In addition, aggregation of TDD cell and FDD cell is also supported and the uplink-downlink configuration of the TDD cell may be semi-statically configured or dynamically changed. For a UE, if the CA mode is configured, one cell is a Primary Cell (Pcell) and other cells are Secondary Cells (Scell). According to the method of LTE, for each cell, downlink data is transmitted based on Hybrid Automatic Retransmission reQuest (HARQ) scheme. Accordingly, the UE needs to feed back HARQ-ACK information of multiple cells. The UE also needs to feed back CSI of multiple cells.

Figure 1:
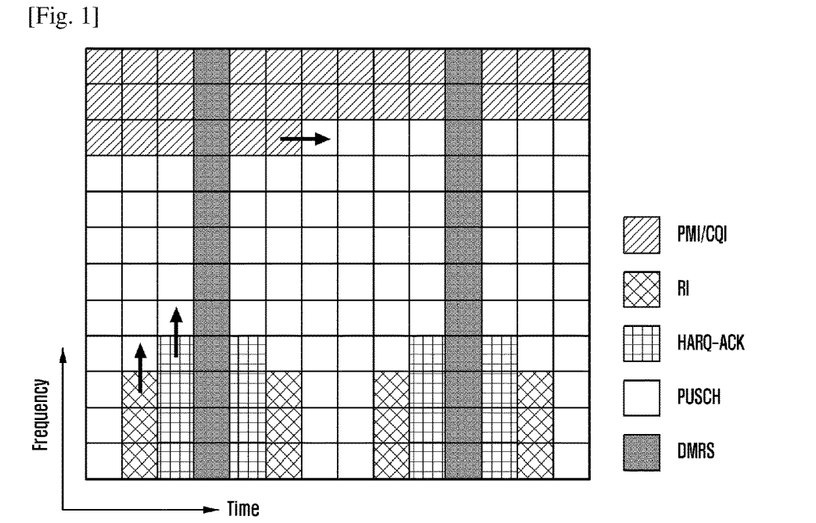
FIG. 1 is a schematic diagram illustrating mapping of UCI on the PUSCH in the LTE system.

In the LTE system, Physical Uplink Control Channel (PUCCH) format 3 is supported at present. According to PUCCH format 3, a joint coding is performed to multiple HARQ-ACK bits from, e.g., multiple configured cells, and the coded bits are mapped to a physical channel for transmission. The PUCCH format 3 supports the transmission of up to 22 bits. According to the LTE, when it is required to feed back Uplink Control Information (UCI) in the Physical Uplink Shared Channel (PUSCH), different processing methods are adopted for different kinds of UCI. For example, FIG. 1 shows an example of multiplexing of HARQ-ACK, Rank Indicator (RI) and Channel Quality Indicator/Precoding Matrix Indicator (CQI/PMI) on the PUSCH. After coding and rate matching, the CQI/PMI information is mapped using a method similar as uplink data, i.e., using a time preferred mapping method. The HARQ-ACK information is mapped to four symbols adjacent to DMRS and the mapping method has a reverse frequency direction compared to the CQI/PMI. As such, if the HARQ-ACK information needs to occupy more Resource Elements (REs), the HARQ-ACK information may occupy the REs used by the CQI/PMI, so as to ensure the transmission of the more important HARQ-ACK information. Similar as the HARQ-ACK information, the RI information is mapped to symbols adjacent to the HARQ-ACK information and its mapping method also has a reverse frequency direction compared to the CQI/PMI. Thus, when the RI information needs to occupy more REs, the RI information may occupy the REs of the CQI/PMI, so as to ensure the transmission of the more important RI information.

According to the current LTE specifications, as to the Periodic CSI (P-SCI) feedback, the periodicity, subframe offset and occupied PUCCH for the P-SCI are configured respectively for each cell. For a cell configured with multiple CSI processes, periodicity and subframe offset may be respectively configured for the P-CSI of each CSI process. But all CSI processes of the same cell use the same PUCCH. Thus, if multiple P-CSI need to be transmitted in one subframe, the UE only transmits the P-CSI with the highest priority and drops other P-CSI with lower priorities. In the current LTE specifications, parameters used for determining the priority of the P-CSI are as follows in a descending order of their priorities: CSI report type, CSI process ID, cell ID and CSI subframe set index. In particular, the CSI report types are compared first. If the CSI report types are the same, the CSI process IDs are compared. If the CSI process IDs are also the same, the cell IDs are compared. If the cell IDs are the same, the CSI subframe set indexes are compared.

According to the current LTE specifications, for cell c, the transmit power for the PUCCH transmission in subframe i is defined by:

$$P_{PUCCH}(i) = \min\begin{cases} P_{CMAX,c}(i), \\ P_{0\_PUCCH} + PL_c + \\ h(n_{CQI}, n_{HARQ}, n_{SR}) + \\ \Delta_{F\_PUCCH}(F) + \Delta_{TxD}(F') + g(i) \end{cases} (dBm),$$

wherein definitions of the parameters in the above formula may be seen from 3GPP specification 36.213, section 5.1.2.1 and are briefly described as follows:

$P_{CMAX,c}(i)$ is a configured maximum UE transmit power in subframe i for cell c; $\Delta_{F\_PUCCH}(F)$ is a power offset relative to a reference format (in the LTE, the reference format is PUCCH format 1a); $\Delta_{TxD}(F')$ corresponds to a PUCCH format and is relevant to whether transmission diversity is adopted; $PL_C$ denotes path loss; $P_{0\_PUCCH}$ is a power offset configured by higher layer signaling; g(i) is an accumulative value of closed loop power control; $h(n_{CQI}, n_{HARQ}, n_{SR})$ denotes a power offset relative to PUCCH format and the number of UCI bits to be fed back, $n_{CQI}$ denotes the number of CSI bits to be fed back in subframe i; $n_{HARQ}$ denotes the number of effective HARQ-ACK bits actually transmitted in subframe i. For example, for PUCCH format 3, when CSI is to be fed back, $$h(n_{CQI}, n_{HARQ}, n_{SR}) = \frac{n_{HARQ} + n_{SR} + n_{CQI} - 1}{3}.$$

At present, 3GPP is working on the standardization of enhanced CA technique which may aggregate more cells. For example, the number of aggregated cells may reach 32. At this time, for a UE, the configured cells may be divided into multiple groups or put in only one group. For each group, UCI is fed back on the PUCCH of a cell of the group. The cell used for feeding back the UCI is similar to the Pcell in the current CA technique. Herein, the number of cells in each group may exceed the maximum number of aggregated cells supported by the current CA technique. Since the number of cells whose UCI needs to be fed back on the PUCCH of a cell increases, the amount of HARQ-ACK information and CSI need to be fed back on the PUCCH inevitably increase, e.g., more than 22 bits. In fact, the UCI transmitted by the UE in the uplink may further include Scheduling Request (SR), and the CSI may be further divided into Periodic CSI (P-CSI) and Aperiodic CSI (A-CSI).

DISCLOSURE OF INVENTION

Technical Problem

Accordingly, in order to support the transmission of the UCI exceeding 22 bits, a new PUCCH format is required. This format may be completely new or may be obtained by modifying current PUCCH format 3, PUSCH or other channel structures. Hereinafter, both of them are referred to as PUCCH format X. The introducing of the PUCCH format X has brought out a series of impacts. Therefore, the transmission method of the UCI needs to be designed accordingly.

Solution to Problem

Embodiments of the present disclosure provide a method for transmitting uplink control information. The technical solution of the present disclosure is as follows.

A method for transmitting uplink control information, including:
receiving, by a User Equipment UE, configuration information for Uplink Control Information UCI, wherein the UCI configuration information includes information for determining a periodicity, an offset and a Physical Uplink Control Channel PUCCH for Periodic-Channel State Information P-CSI to be report in one subframe and configuration information for transmission of Hybrid Automatic Retransmission reQuest-Acknowledgement HARQ-ACK; and
processing, by the UE, one or more kinds of UCI in the subframe, and transmitting the UCI on resources using a PUCCH format.

According to the method of the present disclosure, the transmit power for the transmission of the UCI on the PUCCH is optimized. Meanwhile, during the transmission of the P-CSI, the PUCCH resource which is preferable for transmitting the P-CSI is determined. As such, the uplink resource utilization ratio is increased.

Advantageous Effects of Invention

Embodiments of the present disclosure provide a method for transmitting uplink control information in order to support the transmission of the UCI exceeding 22 bits.

MODE FOR THE INVENTION

The present disclosure will be described in further detail hereinafter with reference to accompanying drawings and embodiments to make the objective, technical solution and merits therein clearer.

For a UE, the UCI of all cells may be fed back on the PUCCH of the Pcell. Or, the UE configured cells may be divided into groups and the UCI of each group is fed back on the PUCCH of a selected cell of the group. Each group of cells forms a PUCCH Cell Group (CG). Herein, the UCI of the PUCCH CG where the Pcell is located is fed back on the Pcell. Some embodiments of the present disclosure describe a method for transmitting UCI on the PUCCH of a cell. This method may be applicable for each PUCCH CG of the UE.

In the LTE system, the UCI may include various kinds of information, i.e., HARQ-ACK, SR, P-CSI and A-CSI. In an uplink subframe, the UE may need to feed back one or more or all kinds of the above UCI. The CSI is further divided into two types. One is information has a higher reliability requirement such as RI. The other is information has a relatively lower reliability requirement, e.g. CQI/PMI. Hereinafter, the CSI with the higher reliability requirement is referred to as first type CSI and the CSI with lower reliability requirement is referred to as second type CSI, i.e., the first type CSI has higher reliability requirement than the second type CSI.

In order to feed back more UCI on the PUCCH of one subframe, the LTE system has to introduce at least one new PUCCH format which is able to support a larger payload. This format may be a completely new format, or may be obtained based on existing PUCCH format 3, PUSCH or other channel structures. Hereinafter, they are referred to as PUCCH format X.

Figure 2:
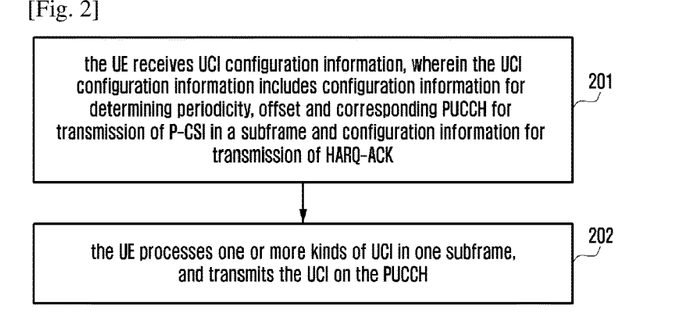
FIG. 2 is a flowchart illustrating a method for transmitting UCI on PUCCH using format X according to an embodiment of the present disclosure.

FIG. 2 shows a flowchart of a method for transmitting UCI on PUCCH using format X according to an embodiment of the present disclosure. The method includes the following.

At block 201, the UE receives UCI configuration information, wherein the UCI configuration information includes configuration information for determining periodicity, offset and corresponding PUCCH for transmission of P-CSI in a subframe and configuration information for transmission of HARQ-ACK.

At block 202, the UE processes one or more kinds of UCI in one subframe, and transmits the UCI on the PUCCH.

Hereinafter, the solution of the present disclosure is described with reference to some embodiments.

Embodiment 1

In the current LTE system, one PUCCH format is dedicated for one function. Accordingly, power control parameters are also dedicated for one PUCCH format. For example, PUCCH format 2 is dedicated for transmission of P-CSI. Therefore, uplink transmit power is configured according to the performance requirement of P-CSI. PUCCH format 3 is used for transmitting UCI which includes at least the HARQ-ACK. Due to the existence of the HARQ-ACK, the uplink transmit power is configured according to the requirement of the HARQ-ACK.

In order to support larger payload, the LTE system needs to introduce PUCCH format X. The PUCCH using format X supports transmission of multiple kinds of UCI, i.e., may implement various functions. In addition, without violating the 22-bit restriction of the total number of bits, PUCCH format 3 can also support transmission of multiple kinds of UCI, i.e., implement multiple kinds of functions. In particular, for the PUCCH format X and format 3, it is possible that merely the HARQ-ACK information or merely the P-CSI is transmitted, or two kinds of UCI such as HARQ-ACK and P-CSI are transmitted simultaneously. In the case that the P-CSI is transmitted, there may be different situations: a situation that merely the RI-type P-CSI is transmitted, a situation that merely the CQI/PMI-type P-CSI is transmitted, and a situation that both the RI-type and the CQI-PMI-type P-CSI are transmitted. Generally, different kinds of UCI have different performance requirements, thus have different requirements for power control parameter configuration. For facilitating the description, the PUCCH format X and the PUCCH format 3 are referred to as PUCCH format Y hereinafter.

Based on the above analysis, the PUCCH may support the transmission of different kinds of UCI using format Y. In the embodiments of the present disclosure, uplink power control parameters are respectively configured with respect to different kinds of UCI transmitted on the PUCCH using format Y. For example, uplink power control parameters may be configured respectively for each kind of UCI and each combination of the kinds of the UCI. Or, the UCI may be classified into fewer situations and corresponding uplink power control parameters are configured for each UCI situation, so as to reduce signaling overhead. For example, it is possible to differentiate merely two situations: a situation that merely P-CSI is transmitted and a situation that at least HARQ-ACK is transmitted. Or, based on the reliability requirement, the UCI may be classified into two situations: a situation that merely the CQI/PMI-type P-CSI is transmitted, and a situation that at least HARQ-ACK and/or RI are transmitted. Then, uplink power control parameters may be respectively configured for these two situations. Or, the UCI may be classifies into three situations: a situation that merely CQI/PMI-type P-CSI is transmitted, a situation that RI and HARQ-ACK are transmitted, and a situation that at least HARQ-ACK is transmitted. Then, uplink power control parameters may be respectively configured for the three situations.

For the PUCCH format Y, with respect to different number of bits of the payload, the corresponding coding rate may be different, which inevitably leads to difference of decoding performance. As such, the size of the payload of the PUCCH format Y may be divided into multiple regions, and uplink power control parameters may be configured respectively for each region.

In order to support larger payload, one possible method is to feed back UCI using 16QAM modulation. That means, according to link status, for a UE with a better link, 16QAM may be adopted, whereas for other UEs, QPSK is still utilized. Due to the difference of the modulation schemes, the link performances are different. For example, the configuration of the 16QAM modulation may be relevant to the size of the UCI payload, i.e., if the number of UCI bits exceeds a threshold, it is implicitly indicated that 16QAM is to be utilized. Or, the utilization of 16QAM may also be determined according to the UCI type. For example, in the case that merely the CQI/PMI-type P-CSI is transmitted, 16QAM is utilized; whereas in the case that HARQ-ACK and/or RI are transmitted, QPSK is utilized. Thus, for one PUCCH format Y, uplink power control parameters may be respectively configured according to the adopted modulation scheme.

In order to support larger payload, it is also possible to increase the number of PRBs occupied by the PUCCH using format Y, which has the same effect with decreasing coding rate. Thus, for one PUCCH format Y, uplink power control parameters may be configured with respect to different number of PRBs allocated to the UE.

The above describes some conditions for triggering the respective configuration of the uplink power control parameters, i.e., difference of transmitted UCI, different regions of payload sizes, difference of modulation schemes and vary of PRB numbers occupied by the PUCCH using format Y. For one PUCCH format Y, uplink power control parameters may be configured with respect to different situations of one the above conditions. Or the above conditions may be utilized in combination and the uplink power control parameters may be configured with respect to different combinations of the situations of the above conditions.

One uplink power control processing method is to process the power control of PUCCH using format Y based on the PUCCH power control method in existing specifications.

According to the current LTE specifications, for cell c, the transmit power for the PUCCH transmission in subframe i is defined by:

$$P_{PUCCH}(i) = \min \begin{Bmatrix} P_{CMAX,c}(i), \\ P_{0\_PUCCH} + PL_c + \\ h(n_{CQI}, n_{HARQ}, n_{SR}) + \\ \Delta_{F\_PUCCH}(F) + \Delta_{T \times D}(F') + g(i) \end{Bmatrix} (dBm), \quad (1)$$

wherein definitions for parameters in the formula (1) may be seen from section 5.1.2.1 of 3GPP specification 36.213. Those are briefly described as follows: $P_{CMAX,c}(i)$ denotes a configured UE maximum transmit power in subframe i for cell c; $\Delta_{F\_PUCCH}(F)$ is a power offset relative to a reference format (in the LTE, the reference format is PUCCH format 1a); $\Delta_{TXD}(F')$ corresponds to a PUCCH format and is relevant to whether transmission diversity is adopted; $PL_C$ denotes path loss; $P_{0\_PUCCH}$ is a power offset configured by higher layer signaling; g(i) is an accumulative value of closed loop power control; $h(n_{CQI}, n_{HARQ}, n_{SR})$ is a power offset relative to the PUCCH format and the number of UCI bits to be fed back, $n_{CQI}$ denotes the number of CSI bits to be fed back in subframe i; $n_{SR}$ denotes the number of SR bits to be fed back in subframe i, having a value of 0 or 1; $n_{HARQ}$ denotes the number of effective HARQ-ACK bits actually transmitted in subframe i.

Among the above PUCCH power control parameters, $P_{CMAX,c}(i)$, $PL_C$, and $P_{0\_PUCCH}$ are common parameters and are irrelevant to the PUCCH format, whereas $\Delta_{TXD}(F')$, $\Delta_{F\_PUCCH}(F)$ and $h(n_{CQI}, n_{HARQ}, n_{SR})$ are relevant to the PUCCH format. In particular, for one PUCCH format Y, for different situations of one of the above conditions or for a combination of different situations of above conditions, a first method for configuring the uplink power control parameters includes: configuring $\Delta_{F\_PUCCH}(F)$ respectively and configuring a consistent value for other parameters, such that the value of $\Delta_{F\_PUCCH}(F)$ may be different. Or, for one PUCCH format Y, for different situations of one of the above conditions or for a combination of different situations of above conditions, a second method for configuring the uplink power control parameters includes: respectively configuring different $h(n_{CQI}, n_{HARQ}, n_{SR})$, and configuring a consistent value for other parameters. Or, for one PUCCH format Y, for different situations of one of the above conditions or for a combination of different situations of above conditions, a third method for configuring the uplink power control parameters includes: respectively configuring the parameters $h(n_{CQI}, n_{HARQ}, n_{SR})$ and $\Delta_{F\_PUCCH}(F)$ and configuring a consistent value for other parameters, such that the value of $\Delta_{F\_PUCCH}(F)$ may also be different. The parameter $\Delta_{TxD}(F')$ is relevant to transmission diversity. It is possible to configure a unique $\Delta_{TxD}(F')$ for the PUCCH format Y. Or, based on the above three methods for configuring the uplink power control parameters, the value of $\Delta_{TxD}(F')$ may also be respectively configured, such that the value of $\Delta_{TxD}(F')$ may also be different.

Herein, the parameter $h(n_{CQI}, n_{HARQ}, n_{SR})$ may be a power offset calculated based on respective number of bits of HARQ-ACK, P-CSI and SR. The form of the function may vary with respect to different conditions and different combinations of the conditions, so as to meet the requirement of the link performance. $h(n_{CQI}, n_{HARQ}, n_{SR})$ may also be a function of the number of bits of various kinds of UCI and other parameters. For example, the other parameters may include the number of modulation symbols occupied by each kind of UCI or a total number of modulation symbols of the PUCCH using format Y. In other words, it is possible to calculate $h(n_{CQI}, n_{HARQ}, n_{SR})$ according to the number of bits of one category of UCI and the number of modulation symbols occupied by the kind of UCI. For example, suppose that the number of modulation symbols occupied by the HARQ-ACK and SR is $$N_{RE}^{HARQ-ACK\&SR},$$

then $$h(n_{CQI}, n_{HARQ}, n_{SR}) = f((n_{HARQ} + n_{SR})/N_{RE}^{HARQ-ACK\&SR}).$$

Or, it is also possible to calculate $h(n_{CQI}, n_{HARQ}, n_{SR})$ according to the number of bits of each kind of UCI and their respective number of modulation symbols. For example, suppose that the number of modulation symbols occupied by CSI is $$N_{RE}^{CQI},$$

then $$h(n_{CQI}, n_{HARQ}, n_{SR}) = f(n_{CQI}/N_{RE}^{CQI}, (n_{HARQ} + n_{SR})/N_{RE}^{HARQ-ACK\&SR}).$$

Or, it is also possible to calculate the power offset $h(n_{CQI}, n_{HARQ}, n_{SR})$ according to the number of bits of each kind of UCI and the total number of modulation symbols, then $$h(n_{CQI}, n_{HARQ}, n_{SR}) = f((n_{CQI} + n_{HARQ} + n_{SR})/N_{RE}).$$

The form of parameter $h(n_{CQI}, n_{HARQ}, n_{SR})$ and the function $f(x)$ are not restricted in the present disclosure.

In addition, for the above PUCCH format Y, for different situations of one of the above conditions or for different combinations of situations of the above conditions, it is possible to respectively configure the parameter $P_{0\_PUCCH}$, such that the value of $P_{0\_PUCCH}$ may be different, so as to meet the power control requirements in different situations. According to this method, the $P_{0\_PUCCH}$ is no longer a common parameter irrelevant to the PUCCH format. Herein, with respect to different situations of one of the above conditions or combinations of different situations of the above conditions, it is possible to support the change of merely the parameter $P_{0\_PUCCH}$ in the above PUCCH power control formula, or support the change of other power control parameters $$\Delta_{F\_PUCCH}(F), h(n_{CQI}, n_{HARQ}, n_{SR}) \text{ and/or } \Delta_{TxD}(F')$$

in addition to the parameter $P_{0\_PUCCH}$.

In addition, in the method for configuring uplink power control parameters based on the number of PRBs occupied by the PUCCH using format Y, an item $M_{PRB}(i)$ reflecting the number of PRBs may be introduced into the PUCCH power control formula (1), e.g., $$P_{PUCCH}(i) = \min\begin{Bmatrix} P_{CMAX,c}(i), \\ 10\log_{10}(M_{PRB}(i)) + P_{0\_PUCCH} + \\ PL_c + h(n_{CQI}, n_{HARQ}, n_{SR}) + \\ \Delta_{F\_PUCCH}(F) + \Delta_{TxD}(F') + g(i) \end{Bmatrix}[dBm] \quad (2)$$

The present disclosure does not restrict whether other power control parameters $P_{0\_PUCCH}$, $\Delta_{F\_PUCCH}(F)$, $h(n_{CQI}, n_{HARQ}, n_{SR})$ and/or $\Delta_{TxD}(F')$ are changed according to the number of the PRBs.

In addition, in the method for configuring uplink power control parameters based on the modulation scheme of the PUCCH format Y, an item $\Delta_{MOD}(F'')$ reflecting the modulation scheme may be introduced into the PUCCH power control formula, i.e., $\Delta_{MOD}(F'')$ may be respectively configured with respect to the modulation schemes QPSK and 16QAM, as such the value of $\Delta_{MOD}(F'')$ may be different. For example, $$P_{PUCCH}(i) = \min\begin{Bmatrix} P_{CMAX,c}(i), \\ P_{0\_PUCCH} + PL_c + \\ h(n_{CQI}, n_{HARQ}, n_{SR}) + \\ \Delta_{F\_PUCCH}(F) + \Delta_{TxD}(F') + \\ \Delta_{MOD}(F'') + g(i) \end{Bmatrix}[dBm] \quad (3)$$

It is not restricted in the present disclosure that whether other power control parameters $P_{0\_PUCCH}$, $\Delta_{F\_PUCCH}(F)$, $h(n_{CQI}, n_{HARQ}, n_{SR})$ and/or $\Delta_{TxD}(F')$ are changed while the modulation scheme changes.

Another method for processing the uplink power control is to process the power control of the PUCCH using format Y based on the current PUSCH power control method.

According to the existing LTE specifications, in the case that there is no PUCCH transmission, for cell c, the transmit power for the PUSCH transmission in subframe i is defined by:

$$P_{PUSCH,c}(i) = \min\begin{Bmatrix} P_{CMAX,c}(i), \\ 10\log_{10}(M_{PUSCH,c}(i)) + \\ P_{0\_PUSCH,c}(j) + \\ \alpha_c(j) \cdot PL_c + \Delta_{TF,c}(i) + f_c(i) \end{Bmatrix}[dBm] \quad (4)$$

Definitions of the parameters in the formula (4) may be seen in 3GPP 36.213, section 5.1.1.1 and are briefly described as follows: $P_{CMAX,c}(i)$ denotes the maximum configured UE transmit power for cell c; $P_{PUSCH,c}(i)$ denotes the number of PRBs occupied by the PUSCH; $P_{0\_PUSCH,c}(j)$ is a power offset configured by higher layer signaling; $PL_C$ denotes link path loss;

$$\alpha_c(j)$$

is used for compensating for some or all of the path loss; $f_c(i)$ is an accumulative value of closed loop power control; $\Delta_{TF,c}(i)$ is a parameter relative to MCS of uplink transmission. In particular, for $K_s=1.25$, $$\Delta_{TF,c}(i)=10 \log_{10}((2^{BPRE \cdot K_s}-1) \cdot \beta_{offset}^{PUSCH}).$$

For A-CSI is sent without uplink data, $$BPRE=O_{CQI}/N_{RE}, \beta_{offset}^{PUSCH}=\beta_{offset}^{CQI}.$$

For the case that uplink data is sent, $$BPRE = \sum_{r=0}^{C-1} K_r / N_{RE}, \beta_{offset}^{PUSCH} = 1;$$

C denotes the number of CBs divided from one TB, $K_r$ denotes the number of bits of the rth CB, $N_{RE}$ denotes the number of REs included in the PUSCH.

If the above PUSCH power control formula is used for PUCCH power control, then $$P_{PUCCH,c}(i) = \min \begin{Bmatrix} P_{CMAX,c}(i), \\ 10\log_{10}(M_{PUSCH,c}(i)) + \\ P_{0\_PUSCH,c}(j) + \\ \alpha_c(j) \cdot PL_c + \Delta_{TF,c}(i) + f_c(i) \end{Bmatrix} [dBm] \quad (5)$$

wherein $\alpha_c(j)$ may be configured to 1, such that it is consistent with general PUCCH power control processing method. $f_c(i)$ is modified to be processed based on TPC command of the PUCCH.

$M_{PUSCH,c}(i)$ denotes the number of PRBs occupied by the PUCCH using format Y. If there is only one PUCCH using format Y in a subframe, the PUCCH using format Y may be used for transmitting the UCI. At this time, $M_{PUSCH,c}(i)$ denotes the number of PRBs occupied by the PUCCH using format Y. If multiple kinds of UCI need to be fed back in the subframe and multiple PUCCHs using format Y are correspondingly configured, one of the PUCCH using format Y may be used for transmitting the multiple kinds of UCI, thus the $M_{PUSCH,c}(i)$ denotes the number of PRBs occupied by this PUCCH using format Y. Or, the PRBs of multiple PUCCHs using format Y may be utilized to transmit the UCI. For example, the UCI may be transmitted on all PRBs of the multiple PUCCHs using format Y according to the structure of the PUSCH. Thus, the $M_{PUSCH,c}(i)$ denotes the sum of PRBs of the multiple PUCCHs using format Y. For example, if the PRBs of two PUCCHs using format Y are inconsecutive, they correspond to a PUSCH including two sets of PRBs, wherein each set of PRBs corresponds to one PUCCH using format Y.

If the value of $P_{O\_PUSCH,c}(j)$ configured for the uplink transmission of PUSCH does not meet the requirement of PUCCH, the parameter $P_{O\_PUSCH,c}(j)$ used for the PUCCH power control may be specially configured by higher layer signaling, thus its value may be different from conventional PUSCH power control parameter. In particular, the value range of the parameter $P_{O\_PUSCH,c}(j)$ used for the PUCCH power control may be different from that used for PUSCH power control. Herein, it is possible to configure the same parameter $P_{O\_PUSCH,c}(j)$ for all situations of the PUCCH format Y. Or, according to the above analysis, different kinds of UCI have different performance requirements and therefore have different configuration requirements for the power control parameters. Accordingly, it is possible to respectively configure the parameter $P_{O\_PUSCH,c}(j)$ with respect to different kinds of UCI transmitted on the PUCCH using format Y. As such, with respect to different kinds of UCI, the value of the $P_{O\_PUSCH,c}(j)$ may be different. Herein, the uplink power control parameters may be respectively configured for each kind and each combination of UCI. Or, the UCI may be classified into fewer situations, and uplink power control parameters may be configured with respect to these situations, so as to reduce signaling overhead.

$$\Delta_{TF,c}(i)=10 \log_{10}((2^{BPRE \cdot K_s}-1) \cdot \beta_{offset}^{PUSCH})$$

may be changed to be processed based on the UCI fed back on the PUCCH using format Y, e.g., calculated according to the number of UCI bits $$N_{UCI}, BPRE=N_{UCI}/N_{RE}.$$

Herein, $N_{RE}$ denotes the total number of REs in the PRBs used for feeding back the UCI. If merely one kind of UCI is fed back on the PUCCH using format Y, e.g., P-CSI or HARQ-ACK, $N_{UCI}$ equals to the number of bits of this kind of UCI. The power control is processed based on the parameter $\beta_{offset}^{PUSCH}$ corresponding to this kind of UCI. If multiple kinds of UCI are fed back simultaneously, $N_{UCI}$ may denote the sum of bits of various kinds of UCI fed back in one subframe, and the parameter $\beta_{offset}^{PUSCH}$ of one of the multiple kinds of UCI is adopted to process the power control, e.g., the parameter of the UCI having the highest reliability requirement among the multiple kinds of UCI. Or, $N_{UCI}$ may be obtained after processing the number of bits of each kind of UCI.

For example, the number of bits of each kind of UCI is equivalently converted into the number of bits of the same selected kind of UCI and a sum of the equivalent numbers of bits is calculated, and the parameter $\beta_{offset}^{PUSCH}$ of the selected kind of UCI is adopted to process the power control. The detailed form of the function for converting the number of bits of each kind of UCI is not restricted in the present disclosure. Or, for multiple kinds of UCI transmitted in one subframe, the power control may be implemented based on the number of bits $n_m$ of one kind UCI m and the number of its occupied modulation symbols $N_{RE}^m$, i.e., $$BPRE=N_M/N_{RE}^m,$$

and adopting the parameter $\beta_{offset}^{PUSCH}$ of this kind of UCI m. For example, the UCI m may be the kind of UCI having the highest reliability requirement among the multiple kinds of UCI transmitted in the same subframe, e.g. HARQ-ACK. $\Delta_{TF,c}(i)$ may realize the effect of adjusting the transmit power according to the number of UCI bits, i.e., similar to $h(n_{CQI}, n_{HARQ}, n_{SR})$ in the PUCCH power control formula. Herein, since the PUCCH using format Y and the current PUSCH have different performance requirements and different interference scenarios, the parameter $\Delta_{TF,c}(i)$ for the PUCCH using format Y may be configured by higher layer signaling, thus its value may be different from that of conventional PUSCH. For example, a different parameter $K_s$ used for PUCCH power control may be configured in advance or configured via higher layer signaling.

According to the above analysis, the PUCCH using format Y may bear different kinds of UCI. Since the different kinds of UCI have different performance requirements, the configuration of their power control parameters also need to be different. Thus, with respect to different kinds of UCI transmitted in the PUCCH using format Y, the uplink power control parameters have to be configured respectively. A parameter $\Delta_{UCI}(i)$ relevant to the kind of the transmitted UCI may be introduced in the formula (5):

$$P_{PUCCH,c}(i) = \min \begin{Bmatrix} P_{CMAX,c}(i), \\ 10\log_{10}(M_{PUSCH,c}(i)) + \\ P_{0\_PUSCH,c}(j) + \alpha_c(j) \cdot \\ PL_c + \Delta_{TF,c}(i) + \\ \Delta_{UCI}(i) + f_c(i) \end{Bmatrix} [dBm] \quad (6)$$

With respect to different kinds of UCI transmitted in the PUCCH using format Y, the parameter $\Delta_{UCI}(i)$ may be configured differently, so as to have different values. Herein, the uplink power control parameters may be respectively configured for each kind and each combination of the UCI. Or the UCI may be classified into fewer situations, and the uplink power control parameters may be configured with respect to each situation, so as to reduce signaling overhead.

Embodiment 2

In order to support larger payload, the LTE system needs to introduce PUCCH format X. A PUCCH using format X may bear various kinds of UCI. In addition, without violating the 22-bit restriction of the total number of bits, the PUCCH format 3 is also able to bear multiple kinds of UCI. For facilitating the description, the PUCCH format X and the PUCCH format 3 are referred to as PUCCH format Y hereinafter.

For one PUCCH using format Y, if multiple kinds of UCI needs to be fed back, joint coding, rate matching and modulation may be performed to all of the UCI without differentiating the UCI, and then the UCI is mapped to the PUCCH using format Y. At this time, the uplink transmit power is calculated according to the total number of UCI bits based on the kind of UCI with the highest reliability requirement among the transmitted UCI. Suppose that the power control formula for the kind of UCI with the highest reliability requirement is P=f(x), wherein x denotes the number of bits of the UCI having the highest reliability requirement. Then the UE uplink transmit power is $$P_{total} = f\left(\sum_i N_i + N_{CRC}\right),$$

wherein denotes number of bits of the th kind of UCI fed back in the subframe, $N_{CRC}$ denotes the number of CRC bits added for the UCI transmission. The number of CRC bits may be 0, i.e., no CRC bit is added; or it may be an integer larger than 0.

For example, according to the method of embodiment 1, the uplink power control parameters are configured with respect to different kinds of UCI transmitted on the PUCCH using format Y. For example, for the situation that merely the CQI/PMI-type P-CSI is transmitted, the uplink power control is performed based on one set of parameters, and for the situation that at least HARQ-ACK and/or RI are transmitted, the uplink power control is performed based on another set of parameters. Or, for the situation that merely the P-CSI is transmitted, the uplink power control is performed based on one set of parameters, and for the situation that at least HARQ-ACK is transmitted, the uplink power control is performed based on another set of parameters. Or, the reliability requirements of the HARQ-ACK and the RI are differentiated. The CQI/PMI-type P-CSI has the lowest reliability requirement. Thus, for the situation that merely the CQI/PMI-type P-CSI is transmitted, the uplink power control is performed based on a first set of parameters. For the situation that the UCI with higher but not the highest reliability requirement is transmitted, the uplink power control is performed based on a second set of parameters. For the situation that the UCI with the highest reliability requirement is transmitted, the uplink power control is performed based on a third set of parameters.

For the PUCCH using format Y, if it is required to transmit multiple kinds of UCI, the UCI may be firstly classified into different categories. Then coding, rate matching and modulation are respectively performed for different categories of UCI before mapping to the PUCCH using format Y. Herein, each category of UCI is mapped to some modulation symbols of the PUCCH using format Y, and the sum of the modulation symbols of respective category of UCI equals to the total number of modulation symbols of the PUCCH using format Y. For example, the HARQ-ACK and SR may be classified into one category, and the P-CSI may be classified into another category. Or, information with higher reliability requirement such as HARQ-ACK, SR and the first type CSI may be classified into one category, the second type CSI which has lower reliability requirement may be classified into another category. The two categories of UCI are respectively denoted by UCI_1 and UCI_2 and their numbers of bits are respectively N1 and N2. Or, the UCI may be classified into three categories. For example, the HARQ-ACK and the SR are a first category, the first type CSI is a second category, and the second type CSI is the third category. Or, the HARQ-ACK is the first category, the first type CSI and the SR are the second category, and the second type CSI is the third category. The three categories of UCI are respectively denoted by UCI_1, UCI_2 and UCI_3, and their numbers of bits are respectively N1, N2 and N3.

Figure 3:
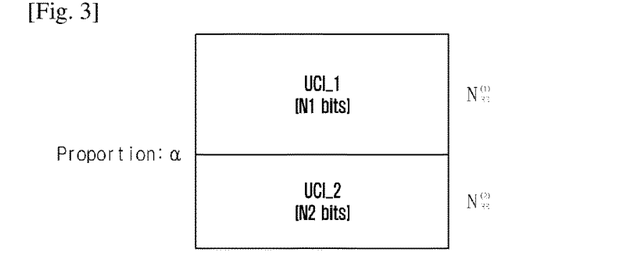
FIG. 3 is a schematic diagram illustrating independent coding and mapping of different categories of UCI according to an embodiment of the present disclosure.

FIG. 3 shows the classification of two categories of UCI according to an embodiment of the present disclosure. Since the coding, rate matching, modulation and channel mapping are respectively performed for each category of UCI, the two categories of UCI respectively occupies $$N_{RE}^{(1)}$$

and $$N_{RE}^{(2)}$$

modulation symbols, wherein the sum of $N_{RE}^{(1)}$ and $N_{RE}^{(2)}$ equals to the total number of modulation symbols of the PUCCH format Y. is an equivalent parameter of the two categories of UCI. For different power control algorithms, there may be different methods to configure $\alpha$.

For example, $\alpha$ may be used for converting the number of bits of respective kind of UCI to an equivalent number of bits of the same kind of UCI information; or, $\alpha$ may be a proportion of transmit powers of two categories of UCI; or, $\alpha$ may be a proportion of numbers of modulation symbols occupied by two categories of UCI.

According to the above UCI classification method, if merely one category of UCI needs to be fed back on the PUCCH using format Y, the uplink transmit power may be determined directly according to the number of bits of this category of UCI. If multiple categories of UCI need to be fed back on the PUCCH using format Y, the power control method for the PUCCH using format Y is described hereinafter.

In a first method, the number of bits of each category of UCI is equivalently converted to the same category, the equivalent total number of bits of this category of UCI is calculated, and the power control is performed according to the equivalent total number of bits based on the requirement of this category of UCI. Herein, the UE transmit power may be calculated using the method for performing power control in embodiment 1 such as formula (1), (2), (3), (5) or (6). For example, suppose that the UCI of the PUCCH using format Y is divided into two categories, without loss of generality, referred to as a first category of UCI and a second category of UCI. The number of bits of the second category of UCI is equivalently converted to the number of bits of the first category of UCI. Thus, the equivalent total number of bits is $N=N_1+\alpha N_2$, wherein $\alpha$ is a coefficient for equivalently converting the number of bits of the second category of UCI to the first category of UCI.

$\alpha$ may be configured by higher layer signaling or defined in advance. Or, $\alpha$ may be calculated based on other parameters. For example, a parameter $\beta_{offset}^{PUSCH}$ is respectively configured for the first category of UCI and the second category of UCI for calculating the number of modulation symbols when they are mapped to the PUSCH for transmission, respectively denoted by $\beta_1$ and $\beta_2$.

At this time, $\alpha$ may be a ratio of $\beta_1$ and $\beta_2$, $\alpha=\beta_1/\beta_2$.

The value of $\alpha$ may also be calculated according to the difference of the performance requirements of the first category of UCI and second category of UCI. Then, based on the power control formula of the first category of UCI $f(N_1)$, wherein $N_1$ denotes the number of bits of the first category of UCI, the UE uplink transmit power may be calculated using the equivalent total number of bits by $f(N)=f(N_1+\alpha N_2+N_{CRC})$.

For example, suppose that the UCI of the PUCCH using format Y is divided into three categories, without loss of generality, referred to as first category of UCI, second category of UCI and third category of UCI. If the all of three categories exist, the number of bits of the second category of UCI and the number of bits of the third category of UCI are equivalently converted to the first category of UCI, thus the equivalent total number of bits is $N=N_1+\alpha N_2+\beta N_3$, wherein and $\alpha$ are $\beta$ respectively parameters for equivalently converting the number of bits of the second category of UCI and the number of bits of the third category of UCI into the first category of UCI.

$\alpha$ and $\beta$ may be configured by higher layer signaling or defined in advance. Or, $\alpha$ and $\beta$ may be calculated based on other parameters. For example, a parameter $$\beta_{\mathit{offset}}^{PUSCH}$$

is respectively configured for the first category of UCI, the second category of UCI and the third category of UCI for calculating the number of modulation symbols when they are mapped to the PUSCH for transmission, respectively denoted by $$\beta_1,$$

$$\beta_2$$

and $$\beta_3.$$

At this time, $$\alpha$$

and $$\beta$$

may respectively be a ratio of $$\beta_2$$

and $$\beta_3$$

to $$\alpha=\beta_2/\beta_1,$$

$$\beta=\beta_3/\beta_1.$$

Then, based on the power control formula of the first category of UCI $f(N_1)$, the UE uplink transmit power may be calculated using the equivalent total number of bits by $$f(N)=f(N_1+\alpha N_2+\beta N_3+N_{CRC}).$$

If there are merely two of the three categories of UCI in the current subframe, the calculation can still be performed based on the above formula, and the number of bits of the category of non-exist UCI is configured to 0. Or, if merely the second category of UCI and the third category of UCI exist, the number of bits of the second category of UCI may be equivalently converted to the number of bits of the second category of UCI, thus the equivalent total number of bits is $$M=N_2+r\,N_3.$$

Then, based on the power control formula of the second category of UCI $g(N_2)$, the UE uplink transmit power may be calculated using the equivalent total number of bits by $$g(M)=g(N_2+r\,N_3+N_{CRC}).$$

r is a coefficient for equivalently converting the number of bits of the third category of UCI to the second category of UCI. r may be configured by higher layer signalling or defined in advance. In particular, r may be calculated based on $$\alpha$$

and $$\beta,$$

e.g., $$\gamma=\beta/\alpha=\beta_3/\beta_2.$$

In a second method, as to the first category of UCI, the uplink transmit power required for feeding back merely this category of UCI on the PUCCH using format Y is calculated according to its number of bits, denoted by $f(N_1)$. Then, according to the number of bits and performance requirement of each category of UCI needs to be fed back in the current subframe, $f(N_1)$ is weighted to obtained the actual UE transmit power. Herein, the UE transmit power may be calculated based on the power control method in embodiment 1, e.g., formula (1), (2), (3), (5) or (6). For example, suppose that the UCI of the PUCCH using format Y is divided into two categories, the UE total transmit power may be $$f(N_1+N_{CRC})\cdot(1+\alpha(N_1,N_2)).$$

Or, suppose that the PUCCH format Y UCI is divided into three categories, the UE total transmit power is $$f(N_1+N_{CRC})\cdot(1+\alpha(N_1,N_2)+\beta(N_1,N_3))$$

if all of the three categories of UCI exist.

$$\alpha(N_1,N_2)$$

is a proportion between the transmit power of the second category of UCI and that of the first category of UCI, $$\beta(N_1,N_3)$$

is a proportion between the transmit power of the third category of UCI and that of the first category of UCI. Function forms of $$\alpha(N_1,N_2)$$

and $$\beta(N_1,N_3)$$

are relevant to the number of bits of respective category of UCI and the performance requirement and are not restricted in the present disclosure. One possible method includes: calculating the above equivalent coefficients $$\alpha(N_1,N_2)$$

and $$\beta(N_1,N_3)$$

according to the number of modulation symbols allocated to each category of UCI. Take $$\alpha(N_1,N_2)$$

as an example, suppose that the number of modulation symbols allocated to the first category of UCI and the second category of UCI are respectively $$N_{RE}^{(1)}$$

and $$N_{RE}^{(2)}.$$

Thus, the equivalent coefficient may be $$\alpha(N_1,N_2)=N_{RE}^{(2)}/N_{RE}^{(1)}.$$

If there are merely two of the three categories of UCI in the current subframe, the calculation may be performed still based on the above formula and the transmit power of the category of non-existing UCI is configured to be 0. Or, if there are merely the second category of UCI and the third category of UCI, the transmit power of the third category of UCI may be equivalently converted to the second category of UCI. The UE total transmit power is $$g(N_2) \cdot (1 + r(N_2, N_3)),$$

wherein $r(N_2, N_3)$ is a ratio of the transmit power of the third category of UCI to the transmit power of the second category of UCI, $r(N_2, N_3)$ may be configured by higher layer signaling or defined in advance. In particular, $r(N_2, N_3)$ may be calculated based on $$\alpha(N_1, N_2)$$

and $$\beta(N_1, N_3),$$

e.g., $r(N_2, N_3) = \beta(N_1, N_3) / \alpha(N_1, N_2)$.

In a third method, for the multiple categories of UCI to be fed back, the UE transmit power is calculated based on the number of bits $N_m$ of merely one category UCI m and the number of modulation symbols $$N_{RE}^{(m)}$$

actually used for transmitting UCI m on the PUCCH using format Y. Herein, $$N_{RE}^{(m)}$$

is smaller than or equal to the total number of modulation symbols $N_{RE}$ available for UCI m on the PUCCH using format Y. The UCI m may be a predefined UCI category or a UCI category defined by higher layer signaling. Or, the UCI m may be a UCI category having the highest reliability requirement, e.g., HARQ-ACK, so as to ensure its transmission performance. Or, the UCI m may be a UCI category having the lowest reliability requirement, e.g., CQI/PMI. Suppose that the UCI with high reliability requirement is considered preferably when allocation modulation symbols of the PUCCH using format Y. Thus, a little proportion of the REs is allocated to the UCI category with lowest reliability requirement, which meets the performance requirement of the UCI category with the lowest reliability requirement and also meet the performance requirement of other UCI categories. For example, based on the formula (5) in embodiment 1, the parameter $$\Delta_{TF,c}(i) = 10 \log_{10}((2^{BPRE \cdot K_s} - 1) \cdot \beta_{offset}^{PUSCH})$$

may be determined according to the number of bits of UCI m and the number of modulation symbols occupied by UCI m, i.e., $$BPRE = N_m / N_{RE}^{(m)},$$

and the parameter $$\beta_{offset}^{PUSCH}$$

corresponding to UCI m is adopted. Herein, BPRE is an actual coding rate in proportion to UCI m. Therefore, the BPRE and $\Delta_{TF,c}(i)$ calculated according to the above method can meet the performance requirement of UCI m. Suppose that the modulation symbols of the PUCCH using format Y are allocated to multiple UCI categories according to their performance requirements, e.g., the modulation symbols are allocated according to the number of bits and the parameter $$\beta_{offset}^{PUSCH}$$

of respective UCI category. Thus, the above power control method is able to ensure the performance of the UCI m as well as the performance requirement of other UCI categories.

Based on the above first, second and third methods, if the multiple categories of UCI fed back in one subframe are equivalently converted to a different UCI category, the calculated total uplink transmit power may be different. Thus, in a fourth method, uplink transmit powers are respectively calculated according to different equivalent converting methods, and a maximum value of the calculated uplink transmit powers is taken as the actual UE uplink transmit power. For example, as to the above first method, suppose that the transmit power is $$f(N) = f(N_1 + \alpha N_2 + \beta N_3 + N_{CRC})$$

if the multiple categories of UCI are equivalently seen as the first category of UCI, and the transmit power is $$g(P) = g(N_2 + \alpha_2 N_1 + \beta_2 N_3 + N_{CRC})$$

if the multiple categories of UCI are equivalently seen as the second category of UCI, and the transmit power is $$z(Q) = z(N_3 + \alpha_3 N_1 + \beta_3 N_2 + N_{CRC})$$

if the multiple categories of UCI are equivalently seen as the third category of UCI. Thus, the UE uplink transmit power may be max[f(N), g(P), z(Q)]. The above functions $f(x)$, $g(x)$, $z(x)$ respectively denotes a form of the function where merely the first, second or third category of UCI is transmitted. These functions may have the same or different forms.

In a fifth method, for each UCI category, the uplink transmit power required for feeding back this category of UCI on the PUCCH using format Y is calculated. Then, a sum of the uplink transmit powers of various categories of UCI need to be fed back in current subframe is calculated to obtain the UE total transmit power for transmitting the UCI. Herein, the transmit power corresponding to each UCI category may be calculated based on the power control method in embodiment 1, e.g., formula (1), (2), (3), (5) or (6). For example, in the case that there are two categories of UCI, suppose that the UE transmit power required for transmitting the two categories of UCI are respectively $f(N_1 + N_{CRC})$ and $g(N_2 + N_{CRC})$. Thus, the UE total transmit power for the two categories of UCI is $f(N_1 + N_{CRC}) + g(N_2 + N_{CRC})$, assuming that CRC with the same length is added to each category of UCI. Or, in the case that there are three categories of UCI, suppose that the transmit power required for transmitting the three categories of UCI are respectively $+N_{CRC}$, $g(N_2 + N_{CRC})$ and $z(N_3 + N_{CRC})$. Thus, the UE total transmit power for transmitting the three categories of UCI is $f(N_1 + N_{CRC}) + g(N_2 + N_{CRC}) + z(N_3 + N_{CRC})$, assuming that the CRC with the same length is added to the three categories of UCI.

In a sixth method, although coding, rate matching and mapping are performed independently for each category of UCI, the power control is still performed based on the total number of bits of the UCI. Herein, the UE transmit power may be calculated according to the transmit power control method in embodiment 1, e.g., the formula (1), (2), (3), (5) or (6). For example, the uplink transmit power may be calculated according to the power control formula of the UCI category with the highest reliability requirement and according to the total number of UCI bits. According to this method, a conservative transmit power may be configured since the total number of UCI bits is utilized. In addition, since independent coding and mapping are performed with respect to each category of UCI, it is avoided that much power is wasted on the UCI with low reliability requirement. As such, the UCI transmission performance is improved.

In a seventh method, suppose that the UCI is divided into three categories, and each category is respectively coded and mapped to the PUCCH using format Y. However, during the power control processing, some categories may be processed together according to their total number of bits. Herein, the UE transmit power may be calculated according to the transmit power control method of embodiment 1, e.g. formula (1), (2), (3), (5) or (6). For example, the HARQ-ACK may be taken as a first category of UCI, the first type CSI may be taken as a second category of UCI, and the second type CSI may be taken as a third category of UCI. Thus, coding and mapping are performed to the HARQ-ACK and to the first type CSI independently. But since they have similar performance requirement, they may be processed together during the power control, i.e., the uplink transmit power may be calculated based on the total number of bits of the HARQ-ACK and the first type CSI, in combination with the second type CSI.

In the above method, the UCI is divided into categories and coding, rate matching and mapping are performed to each category of UCI independently. It is required to adjust the number of modulation symbols on the PUCCH using format Y occupied by each UCI category according to their respective number of bits. In some cases, the actual coding rate of a certain category of UCI may be especially high, which is not good for ensuring the performance of the UCI. Therefore, it is provided in the present disclosure that, for the method in which coding and mapping are performed independently for each category of UCI, when determining the number of modulation symbols of different categories of UCI, if the coding rate of one category of UCI is especially high, the independent coding is abandoned, i.e., joint coding is performed to all UCI bits before mapping to the PUCCH using format Y for transmission. Otherwise, the independent coding and mapping method is adopted to process the UCI transmission.

Embodiment 3

In one subframe, the UE may have multiple PUCCH formats available for transmitting the UCI. For example, PUCCH format 2 may bear up to 11 bits P-CSI, PUCCH format 3 may bear up to 22 bits UCI, and PUCCH format X may bear more UCI bits. It is subject to the configuration of the base station that which PUCCH format is adopted to transmit the UCI. In particular, for the P-CSI, up to LTE version 12, it is merely supported to transmit the P-CSI using the PUCCH format 2. In fact, the PUCCH format 3 may also be used for feeding back P-CSI, thus up to 22 bits are supported. And PUCCH format X may also be used for feeding back the P-CSI, so as to support more bits. In view of the above, multiple PUCCH formats may be used for transmitting the P-CSI. For one PUCCH using format X, one or more PRBs may be occupied.

According to the current LTE specifications, during the configuration of the P-CSI transmission of the UE, for transmission modes 1-9, the periodicity, subframe offset and PUCCH resource index for the P-CSI are respectively configured for each cell. If the UE is configured with two CSI subframe sets, the periodicity and the subframe offset for the P-CSI may be respectively configured for each subframe set, but merely one PUCCH resource index is configured for one cell. For transmission mode 10, it is supported to configure periodicity and subframe offset respectively for the P-CSI of each CSI process. For a CSI process configured with two CSI subframe sets, periodicity and subframe offset for the P-CSI may be configured respectively for each subframe set; but merely one PUCCH resource index is configured for all CSI processes/CSI subframe sets of the same cell. Herein, although only one PUCCH resource index is configured, since the periodicity and/or offset of the P-CSI of each CSI process/CSI subframe set may be different, the PUCCH resource index may correspond to the PUCCH of different subframes to feed back the P-CSI of different CSI processes/CSI subframe sets.

According to the current LTE specifications, if multiple P-CSI need to be fed back in one subframe, priorities of the P-CSI are considered. The UE merely transmits the P-CSI with the highest priority and directly drops all of the other P-CSI with lower priorities. Herein, the P-CSI with the highest priority is transmitted on the PUCCH corresponding to this P-CSI. In order to provide more opportunities for transmitting the P-CSI, it is possible to support the transmission of P-CSI of multiple cells/CSI processes/CSI subframe sets in one subframe. For example, if the UE is configured with multiple cells, the amount of P-CSI that the UE needs to feed back is increased accordingly, and the probability for feeding back the P-CSI of multiple cells/CSI processes/CSI subframes in the same subframe is also increased. In order to avoid frequent dropping of the P-CSI, it may be supported to transmit the P-CSI of multiple cells/CSI processes/CSI subframes sets simultaneously.

In particular, in the case that reporting of the P-CSI of N cells/CSI processes/CSI subframe sets is configured in one subframe, the PUCCH used for transmitting the P-CSI may be unable to bear the N P-CSI. Thus, it is required to select M P-CSI from the N P-CSI according to a priority rule, wherein M is smaller than or equal to N, and the above M selected P-CSI can be transmitted on the PUCCH. Multiple different PUCCH resources may be configured in the subframe corresponding to the N P-CSI.

One method for determining the M P-CSI transmitted in the subframe includes: determining the number of bits can be transmitted by the PUCCH resources corresponding to the P-CSI of N cells/CSI processes/CSI subframe sets, and selecting M P-CSI according to a maximum value Nmax among the numbers of bits can be transmitted by the PUCCH resources. For example, first M P-CSI with highest priorities under the condition that the total number of bits of the M P-CSI is not larger than Nmax may be selected. Herein, if it is further required to transmit HARQ-ACK in the current subframe, it is possible to select first M P-CSI with highest priorities under the condition that the sum of the total number of bits of the selected M P-CSI and the number of HARQ-ACK bits is not larger than Nmax. The present disclosure does not restrict the method for selecting the M P-CSI from the N P-CSI. Other methods may also be adopted.

Based on the above analysis, the above method is implemented based on the assumption that the reporting of N P-CSI is configured in one subframe and there are multiple corresponding PUCCH resources. Hereinafter, the configuration of the PUCCH resources corresponding to the P-CSI is described.

In a first method, one PUCCH resource is allocated to each cell of the UE, including a PUCCH format and a PUCCH resource index, and it is configured that the PUCCH for each cell for transmitting the P-CSI uses the same PUCCH format. Or, it may be configured by higher layer signaling or defined in advance that the PUCCH for each cell for transmission of the P-CSI use the same PUCCH format, therefore it is not required to configure the PUCCH format for each cell. In addition, a PUCCH resource corresponding to the above PUCCH format is allocated to each cell, such that the PUCCH resource index configured for each cell may be different. For the PUCCH format X, different PUCCH resources may occupy the same number of PRBs or different numbers of PRBs. Herein, it is still restricted that the multiple CSI processes/CSI subframe sets of the same cell are configured with the same PUCCH format.

As described above, there may be multiple PUCCH formats used for transmitting the P-CSI, and they can bear different number of bits. In different subframes, the number of the cells/CSI processes/CSI subframe sets whose P-CSI need to be fed back simultaneously may be different. Accordingly, the preferable PUCCH format for transmitting the P-CSI may also be different. Herein, one preferable method may include: for one subframe, on the premise that the selected M P-CSI can be transmitted, the PUCCH format with lower bearing capability is selected as much as possible, i.e., PUCCH format 2 is selected preferably, then PUCCH format 3, and finally PUCCH format X. For PUCCH formats 2 and 3, multiple channels using such PUCCH format may be multiplexed in one PRB, so as to increase resource utilization ratio. Accordingly, a method for configuring different PUCCH formats used for transmitting P-CSI in different subframes is required. However, the above first method only supports configuring the same PUCCH format in different subframes, which restricts the link performance and the resource utilization ratio of the P-CSI.

In a second method, one PUCCH resource is allocated to each cell of the UE, including a PUCCH format and a PUCCH resource index. But the PUCCH for transmitting the P-CSI configured for each cell is not restricted to use the same PUCCH format, i.e., if N P-CSI configured in one subframe correspond to multiple cells, these P-CSI may correspond to multiple PUCCH formats and corresponding PUCCH resource indexes, e.g., PUCCH format 2, format 3, and/or format X. For the PUCCH format X, different PUCCH resources may occupy the same number or different numbers of PRBs. Herein, it is still restricted that the multiple CSI processes/CSI subframe sets of the same cell are configured with the same PUCCH format.

According to the second method, the same PUCCH resource is utilized for the P-CSI of each CSI process/CSI subframe set of the same cell. However, since different PUCCH resources may be configured for different cells, it is still able to transmit the P-CSI using resources of different PUCCH formats in different subframes through adjusting the P-CSI periodicity and subframe offset of each cell and selecting the PUCCH resource for transmitting the P-CSI in the subframe by a priority rule. For example, the method for selecting the actual PUCCH resource for transmitting the P-CSI may include: for one subframe, on the premise that the selected M P-CSI can be transmitted, selecting the PUCCH resource with a lower bearing capability from the multiple PUCCH resources configured for transmitting the P-CSI. However, since only one PUCCH resource can be configured for one cell, this method restricts the PUCCH resource configuration flexibility of the base station to some extent.

In a third method, one PUCCH resource is respectively configured for each CSI process/CSI subframe set of each cell of the UE, including a PUCCH format and a PUCCH resource index, and it is restricted that the PUCCH for each P-CSI configured in one subframe use the same PUCCH format.

In a fourth method, one PUCCH resource is respectively configured for each CSI process/CSI subframe set of each cell of the UE, including a PUCCH format and a PUCCH resource index, and the PUCCH for each P-CSI configured in one subframe may have a different PUCCH format.

For the third and fourth methods, for one cell, PUCCH resource may be respectively configured for each CSI process; or, PUCCH resource may be respectively configured for each CSI subframe set; or, PUCCH resource may be respectively configured for each combination of (CSI process, CSI subframe set). Herein, for one cell, since the periodicity and subframe set configured for each CSI process/CSI subframe set are generally different from other cells, configuration of different PUCCH formats for transmitting P-CSI in different subframes is realized.

In a fifth method, for one cell of the UE, PUCCH resources of different PUCCH formats are configured for transmitting P-CSI in different subframes, respectively including a PUCCH format and a PUCCH resource index. But it is restricted that the P-CSI of each cell in one subframe is configured to use the same PUCCH format. For example, the PUCCH formats and the PUCCH resource indexes adopted by subframes in one period may be configured using a periodicity T, wherein T is a constant number.

In a sixth method, for a cell of the UE, PUCCH resources of different PUCCH formats are configured for transmitting P-CSI in different subframes, respectively including a PUCCH format and a PUCCH resource index, and the P-CSI of cells in one subframe may be configured with different PUCCH formats. For example, the PUCCH formats adopted by subframes in one period may be configured using a periodicity T, wherein T is a constant number.

Based on the above six methods for configuring PUCCH resource corresponding to the P-CSI, one or more additional PUCCH resources may be configured for the UE by higher layer signaling, respectively including a PUCCH format and a PUCCH resource index. Herein, the additionally configured PUCCH resource may be different from the PUCCH resources configured based on the above six methods. In addition, if multiple additional PUCCH resources are configured, their PUCCH formats may also be different, e.g., PUCCH format 3 and PUCCH format X. Or, the additional multiple PUCCH resources may use the same PUCCH format but occupy different numbers of PRBs. As such, the method configures resources of multiple PUCCH formats for the UE in one subframe. Therefore, the UE is able to select a most preferable PUCCH resource for transmitting the P-CSI. The configuration information of the additionally configured PUCCH resource may be sent only once, i.e., applicable for the P-CSI of each cell/CSI process/CSI subframe set of the UE, thus it is not required to repeatedly transmit for each cell/CSI process/CSI subframe set of the UE. Or, the above six methods for configuring the PUCCH resource corresponding to the P-CSI may be extended directly, i.e., configuring one or more additional PUCCH resources for each cell of the UE, such that the additional PUCCH resource is applicable for all CSI processes/CSI subframe sets of the cell. Or, one or more additional PUCCH resources may be configured for each cell/CSI process/CSI subframe set. As such, for one subframe, multiple different PUCCH resources may be configured for each P-CSI. Accordingly, for the N P-CSI in the subframe, there are also multiple different PUCCH resources, and the UE may select the PUCCH resources actually used for transmitting the P-CSI.

For example, based on the above first method, when configuring the P-CSI of a cell, it is restricted that the PUCCH resource used for transmitting P-CSI of each cell uses the same PUCCH format. This PUCCH format may be configured to the UE via RRC signaling. The information may be repeatedly transmitted to each cell of the UE, or may be transmitted only once and not repeatedly transmitted for each cell. Or, the PUCCH format may be defined in advance, e.g., fixedly configured as PUCCH format 2, i.e., supporting the feedback of the P-CSI of merely one cell/CSI process/CSI subframe set. In addition, the structure of the existing RRC signaling for configuring the PUCCH resource of the P-CSI is reused as much as possible to configure the PUCCH resource index for P-CSI transmission respectively for each cell of the UE. The above resource index of each cell may be the same or different. In addition, a PUCCH resource may be additionally configured for the UE via higher layer signaling, and its PUCCH format may be different from the PUCCH format of the PUCCH resources configured for the cells based on the first method. As such, in each subframe, the UE may have two PUCCH formats used for P-CSI transmission. For example, it is predefined that the PUCCH format configured according to the above first method is PUCCH format 2, and a PUCCH resource with format 3 is additionally configured. Or, multiple PUCCH resources are additionally configured for the UE via higher layer signaling, and the additional PUCCH resources may have different formats. The PUCCH formats of the additionally configured PUCCH resources may be different from the PUCCH format of the PUCCH resources configured for the cells based on the above first method. If multiple PUCCH resources of format X are configured, their numbers of PRBs may be the same or different. Or, multiple PUCCH resources may be additionally configured for the UE via higher layer signaling, and the multiple PUCCH resources have the same PUCCH format X, but they may occupy different number of PRBs. The UE may select a proper PUCCH format according to the total number of P-CSI bits to be fed back in the current subframe and determine a corresponding PUCCH resource index. For example, it is possible to select the PUCCH format which is able to bear the P-CSI to be fed back and has a relatively lower bearing capability, so as to increase the resource utilization ratio.

In one subframe, suppose that the P-CSI of N cells/CSI processes/CSI subframe sets are configured, and the PUCCHs used for P-CSI transmission use the same PUCCH format but may correspond to multiple different PUCCH resource indexes.

In this situation, the UE may transmit the selected M P-CSI using the PUCCH corresponding to one of the multiple PUCCH resource indexes. For example, the PUCCH resource index of the PUCCH used for transmitting the P-CSI of the UE may be the PUCCH resource index corresponding to the P-CSI with the highest priority among the N P-CSI. Or, the PUCCH resource index of the PUCCH used for transmitting the P-CSI of the UE may be the PUCCH resource index corresponding to the P-CSI with the highest priority among the M selected P-CSI. Or, the PUCCH resource index of the PUCCH for transmitting the P-CSI of the UE may be a minimum resource index among the PUCCH resource indexes corresponding to the N P-CSI. Or, the PUCCH resource index of the PUCCH for transmitting the P-CSI of the UE may be a minimum resource index among the PUCCH resource indexes corresponding to the M selected P-CSI.

In this situation, suppose that the UE has the capability of uplink multiple antenna transmission, the P-CSI of N cells/CSI processes are configured in one subframe and at least two PUCCH resource indexes are correspondingly configured; or at least two PUCCH resource indexes are configured corresponding to the selected M P-CSI. Then, the UE is able to transmit the selected M P-CSI utilizing the PUCCHs corresponding to the two PUCCH resource indexes, so as to obtain a transmission diversity effect.

In one subframe, suppose that reporting of the P-CSI of N cells/CSI processes/CSI subframe sets is configured, and the PUCCH used for P-CSI transmission may have different PUCCH formats and PUCCH resource indexes. The above multiple PUCCH resources may be obtained according to any one of the above second to sixth methods for configuring PUCCH resources corresponding to the P-CSI. Or, it is also possible to allocate according to the above sixth method for configuring the PUCCH resources corresponding to the P-CSI and further allocate one or more additional PUCCH resources.

In this situation, the UE may transmit the selected M P-CSI utilizing one of the above multiple PUCCH resources. For example, the PUCCH resource used by the UE for the P-CSI transmission may be the PUCCH resource configured for the P-CSI with the highest priority among the N P-CSI. If there are multiple PUCCH resources correspond to the P-CSI with the highest priority, one of them may be utilized, e.g., the PUCCH resource with the minimum PUCCH resource index. Or, the PUCCH resource used by the UE for the P-CSI transmission may be the PUCCH resource configured for the P-CSI with the highest priority among the M P-CSI. If there are multiple PUCCH resources correspond to the P-CSI with the highest priority, one of them may be utilized, e.g., the PUCCH resource with the minimum PUCCH resource index. Or, the PUCCH resource used by the UE for the P-CSI transmission may be the PUCCH resource which has a highest bearing capability among the PUCCH resources configuring for the N P-CSI. If there are multiple PUCCH resources which have the highest bearing capability, one of them may be utilized, e.g., the PUCCH resource corresponding to the P-CSI with the highest priority, or the PUCCH resource with the minimum resource index. Or, the PUCCH resource used by the UE for the P-CSI transmission may be the PUCCH resource which has the highest bearing capability among the PUCCH resources configuring for the M P-CSI. If there are multiple PUCCH resources which have the highest bearing capability, one of them may be utilized, e.g., the PUCCH resource corresponding to the P-CSI with the highest priority, or the PUCCH resource with the minimum resource index. Or, the PUCCH resource used by the UE for P-CSI transmission may be the PUCCH resource which can bear the M selected P-CSI and has the lowest bearing capability among the PUCCH resources configured for the N P-CSI. If there are multiple PUCCH resources which have the lowest bearing capability, one of them may be utilized, e.g., the PUCCH resource corresponding to the P-CSI with the highest priority, or the PUCCH resource with the minimum PUCCH resource index. Herein, if HARQ-ACK is further to be transmitted in the current subframe, it is also possible to select, among the PUCCH resources configured for the N P-CSI, the PUCCH resource which can bear the M selected P-CSI and the HARQ-ACK and has the lowest bearing capability. Or, the PUCCH resource used by the UE for P-CSI transmission may be the PUCCH resource which can bear the M selected P-CSI and has the lowest bearing capability among the PUCCH resources configured for the M P-CSI. If there are multiple PUCCH resources which have the lowest bearing capability, one of them may be utilized, e.g., the PUCCH resource corresponding to the P-CSI with the highest priority, or the PUCCH resource with the minimum PUCCH resource index. Herein, if HARQ-ACK is further to be transmitted in the current subframe, it is also possible to select, among the PUCCH resources configured for the selected M P-CSI, the PUCCH resource which can bear the M selected P-CSI and the HARQ-ACK and has the lowest bearing capability.

In this situation, suppose that the UE has the capability of uplink multiple antenna transmission, the P-CSI of N cells/CSI processes are configured in one subframe and at least two PUCCH resources are configured accordingly; or at least two PUCCH resources are configured for M selected P-CSI. Then the UE is able to transmit the M selected P-CSI utilizing the two PUCCH resources, so as to obtain a transmission diversity effect. Herein, it is possible to further restrict that the two PUCCH resources used by the UE for the P-CSI transmission have the same PUCCH format.

In a seventh method, for a UE, the PUCCH resources for P-CSI transmission in subframes in one period are configured using a periodicity T, respectively including a PUCCH format and a PUCCH resource index, T is a constant number. The signaling may be sent only once, i.e., not repeatedly sent for each cell/CSI process/CSI subframe set of the UE. According to this method, only one PUCCH resource is configured for P-CSI transmission in one subframe. As such, the UE transmits the P-CSI using this PUCCH resource.

In the embodiments of the present disclosure, the maximum value of the uplink transmit powers obtained via different equivalent converting methods is taken as the actual UE uplink transmit power.

Based on the above analysis, embodiments of the present disclosure further provide an apparatus used for transmitting uplink control information.

Figure 4:
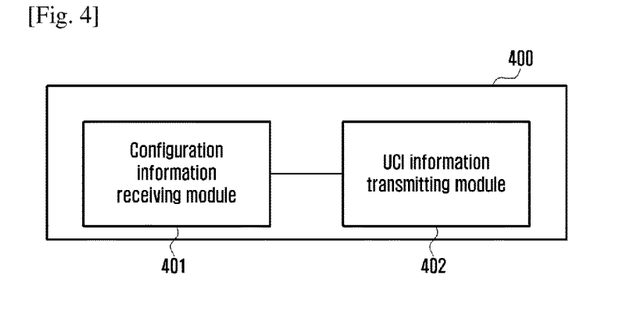
FIG. 4 is a schematic diagram illustrating an apparatus for transmitting uplink control information according to an embodiment of the present disclosure.

FIG. 4 is a schematic diagram illustrating an apparatus for transmitting uplink control information according to an embodiment of the present disclosure. The apparatus 400 is applicable to a UE and includes the following:

a configuration information receiving module 401, to receive Uplink Control Information UCI configuration information, including configuration information used for determining periodicity, offset and PUCCH of the P-CSI to be fed back in one subframe, and configuration information for HARQ-ACK transmission; and a UCI transmitting module 402, to process one or more kinds of UCI in one subframe, and transmit the UCI using PUCCH resource of one PUCCH format.

The foregoing descriptions are only preferred embodiments of this disclosure and are not for use in limiting the protection scope thereof. Any changes and modifications can be made by those skilled in the art without departing from the spirit of this disclosure and therefore should be covered within the protection scope as set by the appended claims.

The invention claimed is:

1. A method for transmitting uplink control information (UCI), by a user equipment (UE), the method comprising:
receiving, from a base station, configuration information on a physical uplink control channel (PUCCH), including information on one or more additional PUCCH resources via higher layer signaling, wherein each of the one or more additional PUCCH resources are for transmitting multiple channel state information (CSI) reports in a transmission occasion, and the information on the additional PUCCH resource includes a PUCCH resource index for the additional PUCCH resource and a PUCCH format for the additional PUCCH resource;
determining, by the UE, a PUCCH resource index for transmitting the multiple CSI reports among one or more PUCCH resource indices corresponding to the one or more additional PUCCH resources, the determined PUCCH resource index being related to a number of bits for the multiple CSI reports; and
transmitting, to the base station, the multiple CSI reports in the transmission occasion on an additional PUCCH resource corresponding to the determined PUCCH resource index.

2. The method of claim 1, further comprising:
performing joint coding, rate matching and modulation to all kinds of UCI and mapping the UCI to the PUCCH, and calculating an uplink transmit power according to a total number of UCI bits based on the kind of UCI with a highest reliability requirement.

3. The method of claim 1, further comprising:
respectively performing coding, rate matching and modulation to each category of UCI, and mapping the UCI to the PUCCH, and determining UE uplink transmit power;
wherein:
HARQ-ACK and SR are taken as a category of UCI, and P-CSI is taken as another category of UCI; or
HARQ-ACK is taken as a category of UCI, and P-CSI and SR are taken as another category of UCI; or
HARQ-ACK, SR and first type CSI are taken as a category of UCI, and second type CSI is taken as another category of UCI; or
HARQ-ACK and SR are taken as a first category of UCI, first type CSI is taken as a second category of UCI, and second type CSI is taken as a third category of UCI; or
HARQ-ACK is taken as a first category of UCI, first type CSI and SR are taken as a second category of UCI, and second type CSI is taken as a third category of UCI.

4. The method of claim 3, wherein determining the UE uplink transmit power comprises:
equivalently converting different categories of UCI into the same category of UCI, calculating a total number of equivalent bits, and performing power control according to the total number of equivalent bits based on the requirement of this same category of UCI; or
for a first category of UCI, calculating an uplink transmit power f(N1) required for feedback this category of UCI according to the number of bits of this category of UCI, performing a weighting operation to f(N1) according to other categories of UCI to be fed back in a current subframe to obtain an actual UE transmit power; or
for multiple categories of UCI to be fed back, calculating the UE uplink transmit power based on the number of bits of one category UCI m and the number of modulation symbols used for transmitting UCI m on the PUCCH using format Y; or
for each category of UCI, respectively calculating an uplink transmit power required for feeding back this category of UCI, and calculating a sum of respective uplink transmit power to obtain the UE uplink transmit power; or
calculating the uplink transmit power according to the total number of UCI bits based on a power control formula of a kind of UCI with the highest reliability requirement; and
if the coding rate of a kind of UCI is higher than a predefined threshold according to the method in which coding and mapping are performed independently for each kind of UCI, joint coding, mapping and transmission are performed to all UCI bits; otherwise, the UCI is processed following the method in which coding and mapping are performed independently for each kind of UCI.

5. The method of claim 1, wherein:
for the P-CSI of N cells/CSI processes/CSI subframes configured in one subframe, selecting and transmitting M P-CSI on the PUCCH, wherein M is not larger than N, and M and N are integers.

6. The method of claim 5, wherein selecting the M P-CSI comprises:
determining the number of bits that the additional PUCCH resources corresponding to the N P-CSI can bear, and selecting first M P-CSI according to the maximum number of bits that the additional PUCCH resource can bear.

7. The method of claim 5, wherein determining the additional PUCCH resource used for transmitting the P-CSI comprises:
configuring the PUCCH for transmission of the P-CSI of each cell use the same PUCCH format, wherein the PUCCH format is configured by higher layer signaling or defined in advance, and configuring the PUCCH resource index respectively for each cell corresponding to the PUCCH format; or
configuring the PUCCH format and the PUCCH resource index for each cell of the UE; or
configuring for each cell of the UE the additional PUCCH resource including the PUCCH format and the PUCCH resource index; or
configuring the additional PUCCH resource including the PUCCH format and the PUCCH resource index for each CSI process/CSI subframe set of each cell of the UE, and configuring that the PUCCH for each P-CSI in the same subframe use the same PUCCH format; or
configuring the additional PUCCH resource including the PUCCH format and a PUCCH subframe set for each CSI process/CSI subframe set of each cell of the UE.

8. The method of claim 5, wherein determining the additional PUCCH resource used for transmitting the P-CSI comprises:
configuring the PUCCH format and the PUCCH resource index of each subframe in one period using a periodicity T, wherein T is a constant number, and configuring that the P-CSI of each cell in one subframe uses the same PUCCH format; or
configuring the PUCCH format and the PUCCH resource index of each subframe in one period using a periodicity T, wherein T is a constant number.

9. The method of claim 7, wherein in one subframe, the additional PUCCH resources used for transmitting the P-CSI have the same PUCCH format, and the PUCCH resource index used by the UE for transmitting the P-CSI is:
the PUCCH resource index corresponding to the P-CSI with the highest priority among the N P-CSI of cells/CSI processes; or
the PUCCH resource index corresponding to the P-CSI with the highest priority among the M selected P-CSI of cells/CSI processes,
wherein in one subframe, the additional PUCCH resource used for transmitting the P-CSI have multiple PUCCH formats, and the PUCCH resource index used for transmission of the P-CSI is:
the additional PUCCH resource corresponding to the P-CSI with the highest priority among the N P-CSI of cells/CSI processes; or
the additional PUCCH resource corresponding to the P-CSI with the highest priority among the M selected P-CSI of cells/CSI processes; or the additional PUCCH resource having a highest bearing capability among the PUCCH resources configured for the P-CSI of the N cells/CSI processes; or
the additional PUCCH resource having a highest bearing capability among the one or more additional PUCCH resources configured for the P-CSI of the M selected cells/CSI processes; or
the additional PUCCH resource which can bear the M selected P-CSI and has a lowest bearing capability among the one or more additional PUCCH resources configured for the P-CSI of the N cells/CSI processes; or
the additional PUCCH resource which can bear the M selected P-CSI and has a lowest bearing capability among the one or more additional PUCCH resources configured for the P-CSI of the M cells/CSI processes.

10. The method of claim 1, wherein the configuration information on the PUCCH further includes information on a number of physical resource block (PRB) for the PUCCH format for the additional PUCCH resource.

11. The method of claim 1, further comprising:
determining a PUCCH transmission power based on a number of physical resource blocks (PRBs) for the PUCCH and a number of UCI bits.

12. The method of claim 1, wherein the determined PUCCH resource index corresponds to a number of bits which is smallest number being greater than or equal to the number of bits for the multiple CSI reports among number of bits corresponding to the one or more additional PUCCH resources.

13. A user equipment (UE) for transmitting uplink control information (UCI), the UE comprising:
a transceiver; and
a controller coupled with the transceiver and configured to control to:
receive, from a base station, configuration information on a physical uplink control channel (PUCCH), including information on one or more additional PUCCH resources via higher layer signaling, wherein each of the one or more PUCCH resources are for transmitting multiple channel state information (CSI) reports in a transmission occasion, and the information on the additional PUCCH resource includes a PUCCH resource index for the additional PUCCH resource and a PUCCH format for the additional PUCCH resource;
determine, by the UE, a PUCCH resource index for transmitting the multiple CSI reports among one or more PUCCH resource indices corresponding to the one or more additional PUCCH resources, the determined PUCCH resource index being related to a number of bits for the multiple CSI reports; and
transmit, to the base station, the multiple CSI reports in the transmission occasion on an additional PUCCH resource corresponding to the determined PUCCH resource index.

14. The UE of claim 13, wherein the configuration information on the PUCCH further includes information on a number of physical resource block (PRB) for the PUCCH format for the additional PUCCH resource.

15. The UE of claim 13, wherein the controller is configured to:
determine a PUCCH transmission power based on a number of physical resource blocks (PRBs) for the PUCCH and a number of UCI bits.

16. The UE of claim 13, wherein the determined PUCCH resource index corresponds to a number of bits which is smallest number being greater than or equal to the number of bits for the multiple CSI reports among number of bits corresponding to the one or more additional PUCCH resources.

17. A method for receiving uplink control information (UCI), by a base station, the method comprising:

generating configuration information on a physical uplink control channel (PUCCH) including information on one or more additional PUCCH resources, wherein each of the one or more additional PUCCH resources are for transmitting multiple channel state information (CSI) reports in a transmission occasion, and the information on the additional PUCCH resource includes a PUCCH resource index for the additional PUCCH resource and a PUCCH format for the additional PUCCH resource:

transmitting, to a user equipment (UE), the configuration information on the PUCCH via higher layer signaling; and receiving, from the UE, the multiple CSI reports in the transmission occasion on an additional PUCCH resource corresponding to a PUCCH resource index determined among one or more PUCCH resource indices corresponding to the one or more additional PUCCH resources, the determined PUCCH resource index being related to a number of bits for the multiple CSI reports.

18. The method of claim 17, wherein the determined PUCCH resource index corresponds to a number of bits which is smallest number being greater than or equal to the number of bits for the multiple CSI reports among number of bits corresponding to the one or more additional PUCCH resources.

19. A base station for receiving uplink control information (UCI), the base station comprising:

a transceiver; and a controller coupled with the transceiver and configured to control to:

generate configuration information on a physical uplink control channel (PUCCH) including information on one or more additional PUCCH resources, wherein each of the one or more additional PUCCH resources are for transmitting multiple channel state information (CSI)) reports in a transmission occasion, and the information on the additional PUCCH resource includes a PUCCH resource index for the additional PUCCH resource and a PUCCH format for the additional PUCCH resource, transmit, to a user equipment (UE), the configuration information on the PUCCH via a higher layer signaling, and receive, from the UE, the multiple CSI reports in the transmission occasion on an additional PUCCH resource corresponding to a PUCCH resource index determined among one or more PUCCH resource indices corresponding to the one or more additional PUCCH resources, the determined PUCCH resource index being related to a number of bits for the multiple CSI reports.

20. The base station of claim 19, wherein the determined PUCCH resource index corresponds to a number of bits which is smallest number being greater than or equal to the number of bits for the multiple CSI reports among number of bits corresponding to the one or more additional PUCCH resources.

* * * * *